(12) United States Patent
Berger et al.

(10) Patent No.: US 8,727,885 B2
(45) Date of Patent: May 20, 2014

(54) SOCIAL INFORMATION GAME SYSTEM

(75) Inventors: Jonathan Berger, Palo Alto, CA (US); Edmund Wright Helmer, Mountain View, CA (US); Michael Munie, Palo Alto, CA (US); Shailendra Ramineni Rao, East Palo Alto, CA (US); Yoav Shoham, Los Altos Hills, CA (US); Thuc D. Vu, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/974,510

(22) Filed: Dec. 21, 2010

(65) Prior Publication Data

US 2012/0122588 A1     May 17, 2012

Related U.S. Application Data

(60) Provisional application No. 61/413,863, filed on Nov. 15, 2010.

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC ............ 463/42; 463/27; 463/40; 463/41; 434/118; 273/292; 273/243; 709/203; 709/204; 709/205; 709/206; 709/207; 705/16

(58) Field of Classification Search
USPC .......... 463/27, 40, 41, 42; 434/118; 273/292, 273/243; 709/203, 204–207, 212, 216; 705/14.16, 16
See application file for complete search history.

(56) References Cited

U.S. PATENT DOCUMENTS

| | | | |
|---|---|---|---|
| 7,881,963 B2* | 2/2011 | Chudnovsky et al. ..... | 705/14.16 |
| 2001/0049304 A1* | 12/2001 | Orui ................................ | 463/42 |
| 2008/0098313 A1 | 4/2008 | Pollack | |
| 2008/0214148 A1 | 9/2008 | Ramer et al. | |
| 2009/0187923 A1 | 7/2009 | Mckinney | |
| 2009/0247289 A1* | 10/2009 | Sugiyama et al. ............... | 463/27 |
| 2009/0282104 A1 | 11/2009 | O'Sullivan et al. | |
| 2011/0212762 A1* | 9/2011 | Ocko et al. ........................ | 463/25 |
| 2011/0269548 A1* | 11/2011 | Barclay et al. .................. | 463/42 |
| 2011/0275442 A1* | 11/2011 | Hawkins, III .................... | 463/42 |
| 2012/0028718 A1* | 2/2012 | Barclay et al. .................. | 463/42 |

OTHER PUBLICATIONS

International Search Report and Written Opinion for PCT/US2011/058058, Feb. 9, 2012, 6 pages.

* cited by examiner

*Primary Examiner* — Adetokunbo O Torimiro
(74) *Attorney, Agent, or Firm* — Patent Law Works LLP

(57) ABSTRACT

A method to share challenges between users of a social game system is described. The method may include accessing relationship data reflecting a relationship between a first user and a second user, and accessing challenge data in a challenge database. Based on (1) the challenge data and (2) the relationship between the first user and the second user reflected by the relationship data, the challenge data is selectively communicated as part of a challenge about the first user to the second user, with the challenge forming part of a challenge game.

50 Claims, 16 Drawing Sheets

SOCIAL INFORMATION GAME SYSTEM

CLAIM OF PRIORITY

This patent application claims the benefit of priority, under 35 U.S.C. §119(e), to U.S. Provisional Patent Application Ser. No. 61/413,863, entitled "QUIZ GAMING SYSTEM," filed on Nov. 15, 2010, which is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2010, CAFEBOTS, INC. All Rights Reserved.

TECHNICAL FIELD

This patent document pertains generally to computer game systems and methods and more particularly, but not by way of limitation, to methods and systems to present game mechanics to users of a game platform, and to process responses to the presented game mechanics.

BACKGROUND

The number of social media platforms with which users interact has proliferated over the past few years. Examples of such social media platforms include social networking systems (e.g., Facebook), professional networking systems (e.g., LinkedIn), virtual world platforms (e.g., Second Life), messaging systems (e.g., Google email (Gmail), Google Wave, Skype), blogging systems (e.g., Blogspot.com), and review/rating systems (e.g., Yelp.com, Digg.com). Social networking platforms, such as Facebook, are continuing to gain popularity as platforms on which users interact, communicate and share using multiple types of data and communication channels. For example, a number of social networking platforms provide one or more messaging tools, as well as photo and video sharing capabilities. Virtual worlds similarly host vibrant communities of people who interact, play, do business and even find romance online.

One type of application that is a popular on social networking systems is the so called "challenge games," which enabled users to communicate challenges to each other regarding a variety of topics.

BRIEF DESCRIPTION OF THE DRAWINGS

Some embodiments are illustrated by way of example and not limitation in the figures of the accompanying drawings in which.

DETAILED DESCRIPTION

Figure 1:
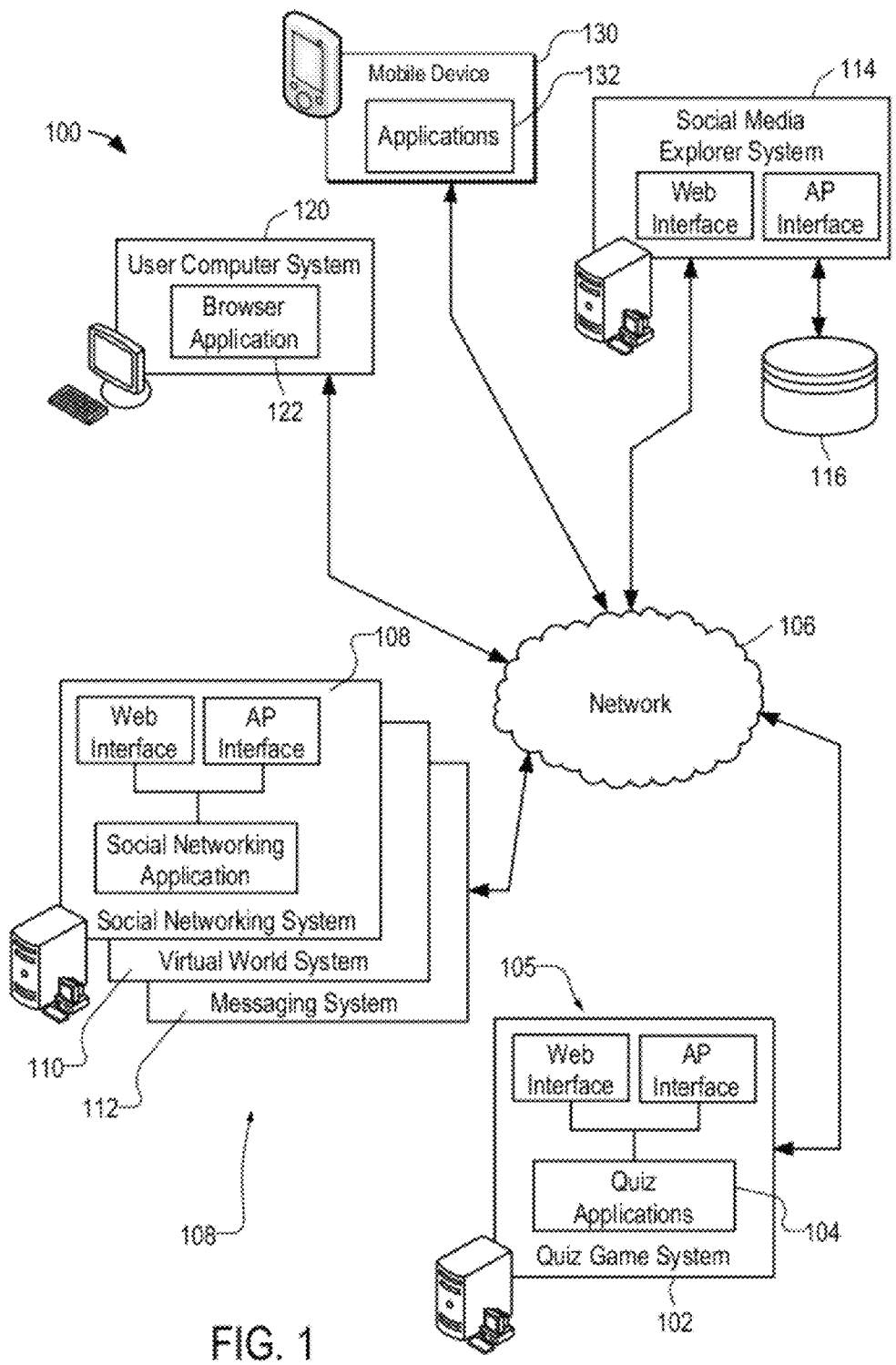
FIG. 1 is a block diagram illustrating an environment within which a social game system may be deployed, according to some example embodiments.

In the following description, for purposes of explanation, numerous specific details are set forth in order to provide a thorough understanding of some example embodiments. It will be evident, however, to one skilled in the art that the present invention may be practiced without these specific details.

According to one example embodiment, there is provided a system to share game challenges (e.g., quizzes) between users of a social game system. The system comprises at least on database storing relationship data relating to relationships between the users of the social game system and challenge data relating to a user challenge presentable within the context of a challenge game. A game module (e.g., a quiz game system), implemented using at least one processor, is configured to selectively communicating the challenge data as part of a challenge relating to a first user to a second user. The challenge forms part of a challenge game (e.g., a quiz game) and the challenge data is selectively communicated based on at least one of the challenge data or the relationships between the users reflected by the relationship data.

In some example embodiment of, the challenge data includes a plurality of challenge templates, and the game module is configured to select a challenge template from the plurality of challenge templates based on relationship between the first user and the second user.

The at least one database may store at least one attribute of the challenge data and at least one attribute of the relationship data, and the game module may be configured to selectively communicate the challenge data based on a comparison of the at least one attribute of the challenge data and the at least one attribute of the relationship data. The at least one attribute of the relationship data may a type attribute, and the game module may be configured to selectively communicate the challenge data based on a type of the relationship between the first user and the second user as reflected in the relationship data. The at least one attribute of the relationship data may further be a relationship strength attribute; and the game module is configured to selectively communicate the challenge data based on a strength of the relationship between the first user and the second user as reflected in the relationship data.

In some example embodiment, the system further includes an interface component configured to retrieve the relationship data from a third party social networking platform.

The game module may be configured to generate the relationship data based on at least one of interactions within the social game system and data received from a third party social networking platform. The game module may further be configured to generate the relationship data using challenge processing algorithms, the challenge processing algorithms including at least one of machine learning algorithms and non-machine learning algorithms.

The relationship data includes a plurality of relationship attributes pertaining to relationships between users of the social game system. In one example, the plurality of relationship attributes include a knowledge attribute having a knowledge value indicative of an assessed knowledge of the second user with respect to the first user.

The game module may be configured to present a plurality of challenges to the second user regarding the first user, and to generate the knowledge value being based on an accuracy of responses of the second user to the plurality of challenges regarding the first user. The game module may further be configured to receive a response to a first challenge of the plurality of challenges from the second user, and to access profile of the first user within the at least one database to assess the accuracy of the response.

In some example embodiments, the game module is configured to access profile data in the at least one database, wherein the profile data pertaining to the users of the social game system, wherein the challenge data comprises a plurality of challenge templates; and wherein the game module is configured to select a challenge template from the plurality of challenge templates based on profile data of the second user retrieved from the at least one database. The profile data of the second user may include historical communications data identifying historical communications of challenge data to the second user; and the game module may be configured to perform the selection of the challenge template using the historical communications data. The game module may furthermore be configured to populate the selected challenge template using the profile data from the at least one database, the profile data pertaining to the users of the social game system. The game module may also generate the profile data based on at least one of interactions within the social game system and data received from a third party social networking platform. The generating of the profile data is, in some example embodiments, performed using challenge processing algorithms, the challenge processing algorithms including at least one of machine learning algorithms and non-machine learning algorithms.

In some example embodiments, the game module may further be configured to generate respective attribute values for a plurality of attributes of the challenge data, and to selectively communicate the challenge data based on at least one of the plurality of attributes of the challenge data. The plurality of attributes of the challenge data may include an entertainment attribute indicative of a historical entertainment measure pertaining to the challenge data, a monetization attribute indicative of a historical monetization measure pertaining to the challenge data, and/or an information attribute indicative of a historical information contribution attributable to the challenge data.

FIG. 1 is a block diagram illustrating an environment 100 within which an example embodiment of a social game system 102, in the example form of a quiz game system, may be deployed. The quiz game system 102 is discussed herein as an example of a challenge game system. As such, the term 'quiz' is used herein to reflect but one example of challenge that may be presented to a user of the social game system. The social game system 102 is shown to host multiple quiz applications 104 and also provides a number of interfaces 105 (e.g., a web interface and an application program interface (API) to provide respective web interfaces to users and programmatic interfaces to remote systems) via which the social game system 102 is accessible to external systems.

The social game system 102 is coupled via a network 106 (e.g., the Internet) to multiple social communication systems, which may include, for example, social networking systems 108, virtual world systems 110, and messaging systems 112. Each of the various types of social networking systems 108 is shown to include both a web interface to generate webpage interfaces to users and APIs to enable programmatic access to the relevant system.

The social game system 102 is also communicatively coupled via the network 106 to a social media explorer system 114. The social media explorer system 114, in one example embodiment, extracts social data (e.g., relationship data) and profile data from the social networking system 108 and stores the extracted data in an associated database 116.

The environment 100 further includes any number of user computer systems 120 hosting applications, such as browser application 122, that enable access to the social game system 102 and the various social communication systems, via the network 106. While the example user computer system 120 is illustrated to host the browser application 122, the user computer system 120 may furthermore host any other number of dedicated applications that may access data and services of any of the other systems shown to be accessible to the user computer system 120 via the network 106.

FIG. 1 also depicts that any number of mobile devices 130 (e.g., smart phones, Personal Digital Assistants (PDAs), tablet computers, etc.) may, via the network 106, also access the described systems. As is the case with the user computer systems 120, a mobile device 130 may host any number of applications (e.g., generic browser applications to access web interfaces or dedicated applications to programmatically access systems via APIs). For example, a mobile device hosted application 132 may, in one example embodiment, comprise a quiz game client application that accesses the quiz applications 104 via the API interface of the social game system interfaces 105.

For the purposes of the present example, functionality may be described as being performed primarily on the social game system 102, which acts as in capacity of a server. However, the location of computational functionality is becoming increasingly fungible as the computing power of client devices (e.g., user computer systems 120 and mobile devices 130) continue to increase. Accordingly, while certain functions and operations are described as being performed, for the purpose of explanation, on the server site, any number of these functions and operations may be migrated to a client-site device and, in other example embodiments, performed by dedicated applications or scripts executing on such client-site devices.

Figure 2:
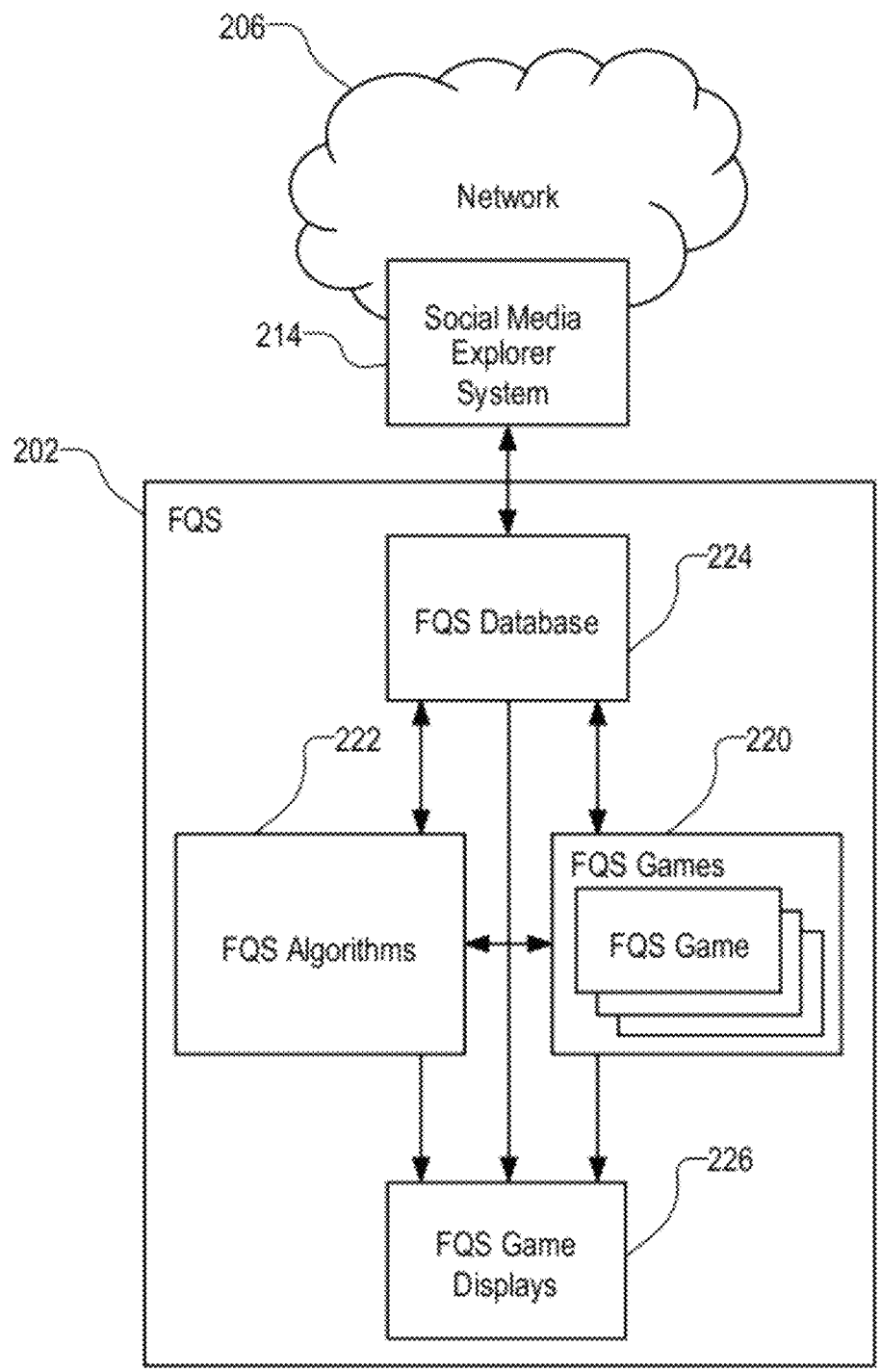
FIG. 2 is a block diagram providing an architectural overview of a social game system in the example form of a friend quiz system, according to some example embodiments.

FIG. 2 is a block diagram providing an architectural overview of a social game system in the example form of a friend quiz system (FQS) 202. The quiz system 202 is coupled to a social media explorer system 214, which is shown to, at least partially, to reside in the 'cloud' and to be accessible via the network 206 by the quiz system 202. As explained above, a social media explorer system 214 may be a system that extracts data (e.g., profile and relationship data) from social networking systems external to the quiz system 202, and that provides this extracted data to the quiz system 202. In some example embodiments, the social media explorer system 214 may reside externally and separate from the quiz system 202 and communicate with the quiz system 202 via the network 206. In other example embodiments, the social media explorer system 214 may be deployed as part of the quiz system 202.

Turning now specifically to the components or subsystems of the quiz system 202, a number of quiz games 220 are supported by the quiz system 202 and, as will be described in further detail below, may be deployed as sequential 'mini-games' or levels of a larger, overarching game. The games 220 may include various game logic and game mechanics, and are furthermore supported by quiz system algorithms 222, which may provide input to the games 220 as well as process output (e.g., game results) from the games 220.

Both the quiz system algorithms 222 and quiz system games 220 are communicatively coupled to have access to quiz system databases 224 that, in addition to storing game results data, also store profile and relationship data for users of the quiz system 202. The quiz system databases 224 may be populated with game result data from the games 220, processed data from the quiz system algorithms 222 (e.g., data pertaining to actions and interactions taken by users within the context of the games 220), and data (e.g., profile and relationship data) provided from the social media explorer system 214.

The quiz system 220 further includes a number of quiz system game displays 226, in the example form of data and interfaces that may be presented to users. These displays, as will be described in further detail below, may include data displays pertaining to the quiz system 220 as a whole (e.g., progress through another data related to the collection of games 220) and displays that are presented within the context of a particular quiz game 220, as well as the display of external data (e.g., data provided by the social media explorer system 214).

Figure 3:
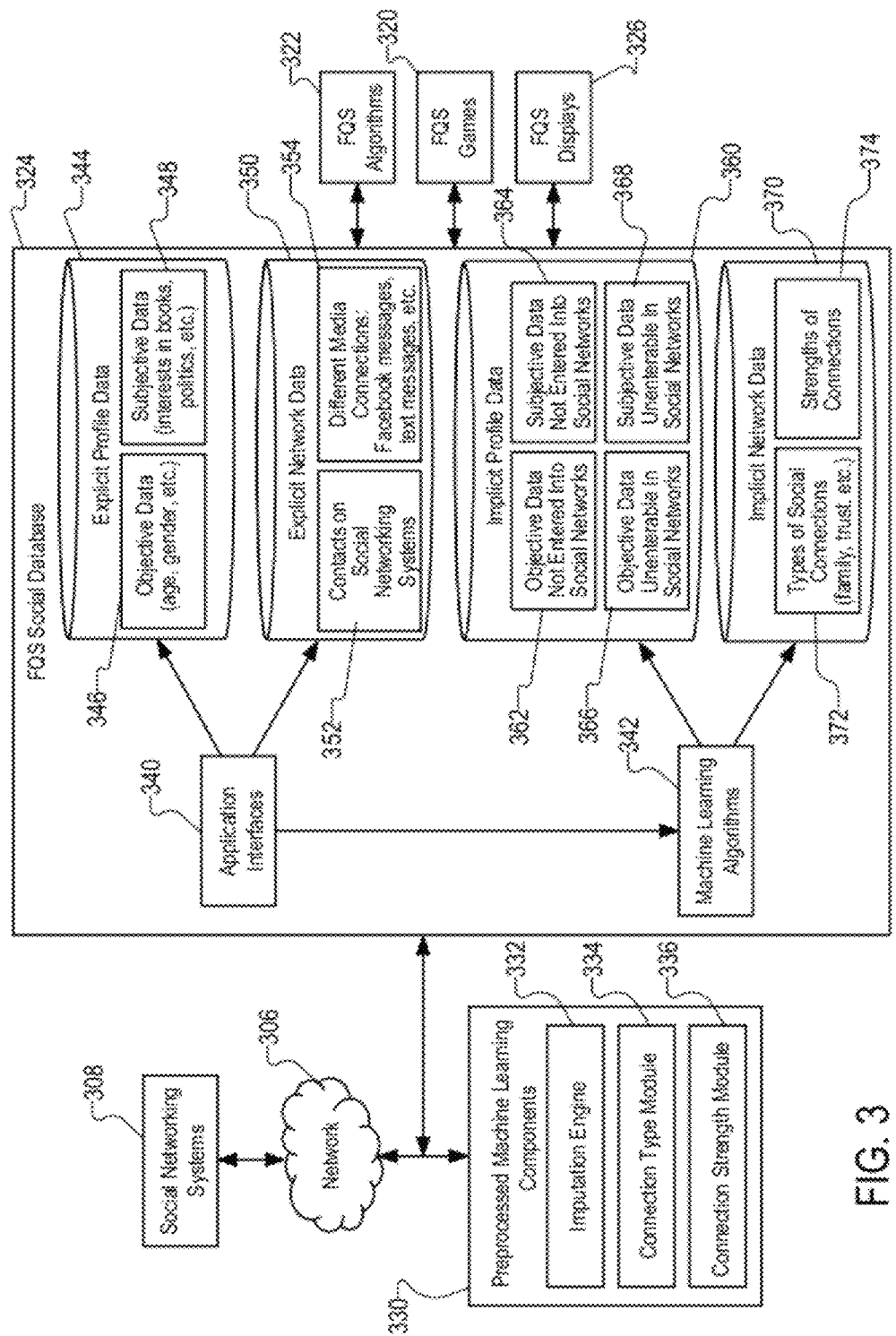
FIG. 3 is a block diagram illustrating content of a friend quiz system social database, according to some example embodiments.

FIG. 3 is a block diagram illustrating further detail regarding content of a friend quiz system social database 324, according to an example embodiment. The social database 324 may, in one example embodiment, be one of the databases that form part of the quiz system databases 224.

The social database 324 is accessible, via a network 306, to social networking systems 308 and external preprocessed machine learning systems 330. Data from both the social media systems 308 (e.g., as extracted by a social media explorer system 214 of FIG. 2) and the external preprocessed machine learning systems 330 may be used to populate the social databases 324 via application interfaces 340 and machine learning algorithms 342.

The external preprocessed machine learning systems 330 may include an imputation engine 332, a connection type module 334 and a connection strength module 336. Briefly, the imputation engine 332 operates to impute both profile and relationship data from social data (e.g., profile, relationship and action data) retrieved from the social networking systems 308. The connection type module 334 may operate to assess a connection type between users identified in social data (e.g., to assess whether a relationship is a business or personal relationship). The connection strength module 336 may assess and assign a value to a relationship strength attribute for a relationship between two users identified in social data from social networking systems 308. To this end, a connection strength module 336 may examine social graph data, reflecting a social graph, as extracted from one or more social networking systems 308, and generate a strength attribute value based on proximity between users as reflected in the social graph data. To this end, a strength value for a particular relationship between first and second users would be provided with a higher strength value for a closer proximity (e.g., a first level connection) as opposed to a distant proximity (e.g., a third level connection).

In addition to receiving data from external sources, such as social networking systems 308, the social databases 324 may also be accessed (e.g., by read or write operations) by a number of the components of the quiz system 202 as described above with reference to FIG. 2. To this end, FIG. 3 shows the quiz system algorithms 322, quiz system games 320 and quiz system displays 326 communicatively coupled to the social database 324. It will be appreciated that information may be both written into the databases and extracted from the databases using or via the algorithms 322, games 320 and displays 326. The internal components may also access specific data within the social databases 324 via the application interfaces 340 and/or the machine learning algorithms 342.

The data within the social databases 324 may be broadly classified as being either explicit data (e.g., data that is directly known as a result of an explicit input by a user) or implicit data (e.g., data that may be inferred or imputed from other data or actions of one or more users). Furthermore, the data in the social database 324 may also be broadly classified as being profile data (e.g., data pertaining to particular attributes of a user, such as contact, demographic data), and network data (e.g., data relating to relationships and connections to other users or entities).

FIG. 3 illustrates the social database 324 to include explicit profile data 344 that may include, for example, objective data 346 (e.g., profile data such as age, gender and other demographic data) and subjective data 348 (e.g., interest in books, politics, movies etc.). The social database 324 also includes explicit network data 350 such as, for example, contacts 352 on social networking systems 308 and various media connections 354 (e.g., other users or entities to which a particular user has sent messages, such as Facebook messages, text messages, etc.). The explicit profile data 344 and explicit network data 350 may, in some embodiments, be provided directly into the social database 324 via application interfaces 340, from the social networking systems 308 (e.g., via a social media explorer system), or via the algorithms 322, games 320 and displays 326.

The social database 324 is also shown to include implicit profile data 360, which is profile data that may not have been directly stated, but which is implied, inferred, suggested or understood from other data. For example, the implicit profile data 360 may include both objective data 362 not explicitly entered into social network data received from external/internal sources, as well as subjective data 364 similarly not explicitly provided via internal or external sources. The implicit profile data 360 may also include objective data 366 that would not be directly enterable internally or externally, and subjective data 368, similarly not enterable via external or internal resources. Such 'unenterable' data may, for example, be profile data that would not typically be solicited from a user. Examples of objective data 362 not entered via a social networking system may include, for example, a user's location of birth or direct family connections. Subjective data 368 that cannot be entered via social network may include, merely for example, complex family connections (e.g., a father-in-law, if a spouse is not currently a member of the social network), or all places of residence of a user's lifetime.

The social database 324 may further include implicit network data 370, which may record any number of attributes regarding network (e.g., relationship) data between users and/or entities. To this end, the network data may comprise many-to-many mappings to record relationships and may attach values to various attributes of those relationships. In other example embodiments, the implicit network data 370 may be reflected as a graph.

Attributes that may be associated with network or relationship data may include type attributes (e.g., personal/business, close friend, family, school friend, work colleague, etc.) 372 and strength attributes 374 (e.g., 'close' friend as opposed to a 'regular' friend, 'current' co-worker as opposed to a 'past' co-worker).

As shown in FIG. 3, both the implicit profile data 360 and the implicit network data 370 may be generated by machine learning algorithms 342. The machine learning algorithms 342 may operate to impute information that a user or entity has not explicitly provided to an external resource (e.g., social network system 308) or internally (e.g., in the context of a game 320). The machine learning algorithms 342, based on explicit profile data 344 and explicit network data 350, as well as information received from the games of the games 320, may impute or extract data to generate the implicit profile data 360 and implicit network data 370.

It is further worth noting that each of the various types of profile and network data described above with reference to FIG. 3 may constitute attributes that allow for the construction of multi-dimensional profile and network data descriptions pertaining to a particular user. Furthermore, these profile and network attributes may have binary values (e.g., a YES/NO) or measured or range values (e.g., a range value expressing the strength of a relationship on a scale of 1 to 10).

Figure 4A:
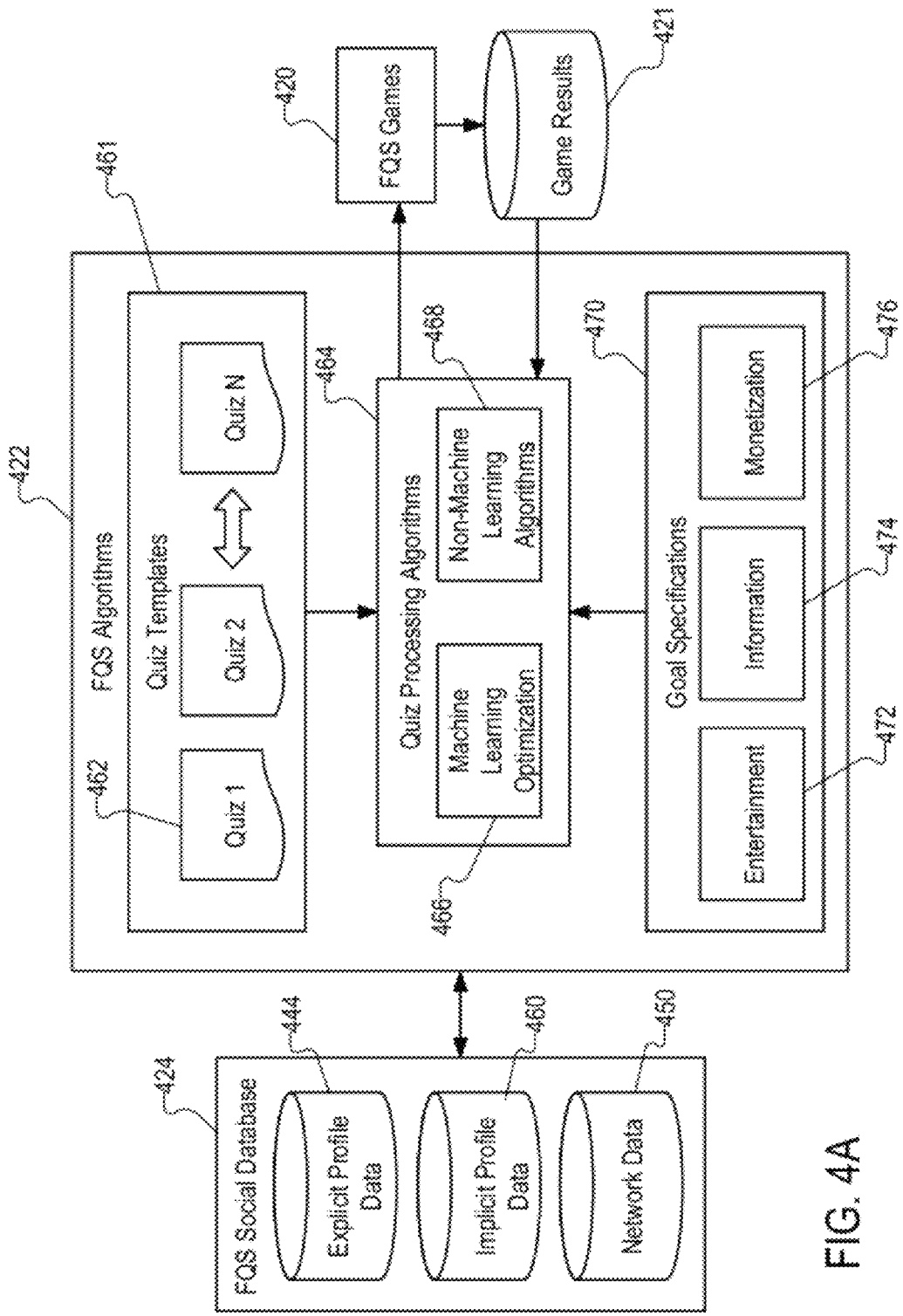
FIG. 4A is a block diagram illustrating components of friend quiz system algorithms, according to some example embodiments.

FIG. 4A is a block diagram illustrating components of friend quiz system algorithms 422, according to some example embodiments. At a high level, the quiz system algorithms 422 access both profile and network (e.g., relationship) data within the social database 424, as well as game results data 421, reflecting profile, relation and interaction data extracted from game play on the games 420. Based on these inputs, the quiz system algorithms 422 seek to optimize on quiz questions that may be presented to a particular user regarding a further user, entity or topic. Such questions may be presented directly by a game system to a "challenged user", or may be presented to a "challenging user" for selective communication to a "challenged user".

The quiz system algorithms 422 may optimize which users, or contacts, in a particular user's social network should be asked about in the context of one or more of the quiz games 420. The quiz system algorithms 422 may also seek to optimize what one user should ask other users (e.g., contacts) within the context of a quiz game 420. To this end, the quiz system algorithms 422 may seek to predict the types of connections a particular user shares with any other given contact and 'a distance' metric between a user and a contact (e.g., which may be used as an approximation of a strength of their relationship or connection). With this predicted data, the quiz system algorithms 422 may tailor quiz games 420, and in particular questions that are communicated from one user to other users (or to one user regarding another user), to only query certain types of connections (or certain strengths of connections) for that user. For example, in the example of a 'dare' quiz game 420, questions within such an application may be optimized so that the user is only prompted or encouraged to challenge 'close friends,' rather than co-workers on account of the nature and type of questions that may be included within a 'dare' quiz game.

Regarding the optimization of which topics or subject matter to be asked about in questions of a particular quiz game 420, the quiz system algorithms 422, in one example embodiment, may predict the likelihood that each contact of a particular user will respond to an interaction (e.g., a question) using the category of information presented. With this predicted data, the quiz system algorithms 422 may maximize the use of questions within the context of games 420, by only asking questions regarding topics likely to be answered by a particular contact of a user. For example, in the context of a 'friend quiz' game 420, such a game may be tailored to question a particular contact more frequently concerning music and film (as opposed to books and hobbies), if that particular contact has shown in past behavior that they would prefer to answer that category of question, or if their profile data (either explicit 444 or implicit 460) reflects as such.

FIG. 4A shows the quiz system algorithms 422 to include multiple challenge processing algorithms 464, which may be broadly categorized as machine learning optimization algorithms 466 and non-machine learning algorithms 468. The challenge processing algorithms 464, in one example embodiment, access challenge data (in the example form of quiz data) from a challenge database (in the example form of a quiz database). The quiz database may take the form of library 461 of quiz templates. A particular template within the library 461 of quiz templates (e.g., quiz 462) may address a particular topic or enquire about a particular type of data or event. In one example embodiment, the quiz templates are populated by the challenge processing algorithms 464 with information received either from the social databases 424, or in the context of a particular game play, with a game result data 421. For example, a particular quiz 462 may ask a first user about a favorite player on the second user's favorite football team. In this example, the quiz template 462 may, at least partially, be populated with profile data (either explicit 444 or implicit 460) regarding the second user's favorite football team.

As noted above, the challenge processing algorithms 422 seek to optimize the selection and communication of quizzes (e.g., questions) to a particular user regarding one or more further users (e.g., contacts of the first user). In one example embodiment, this selective communication of questions is based on attributes of a quiz template 462. The attributes of the quiz template 462 may include content of the quiz template 462, as well as other various attributes. Such attributes may include topic, appropriateness for a particular type of relationship, appropriateness for a particular strength of relationship, and so forth. Thus, in selection and population of the quiz templates 462, the challenge processing algorithms 464 may draw on social data extracted from social databases 424 (e.g., profile or relationship data), as well as game result data 421 (e.g., real time or historic interactions, responses, etc.) within the context of a particular game 420.

The challenge processing algorithms 464 may, in one example embodiment, also generate both explicit 444/implicit 460 profile and network 450 data, based on game result data 421 or extracted within the context of game play for a particular game 420, for inclusion within the social databases 424.

Two examples of implicit network data 450 that may be generated by the challenge processing algorithms 464 include a knowledge depth value, for a knowledge depth attribute, that is associated with a relationship between two users. Specifically, the knowledge depth value may be generated based on a determined assessment of the knowledge of a particular user regarding a further user on a particular topic. For example, user 1 may have a deep knowledge of user 2 on a particular topic (e.g., sports preferences). Accordingly, a knowledge depth attribute associated with the relationship between user 1 and user 2, specific to a 'sport' topic, may be assigned a relatively high attribute value. This attribute value may be determined by the challenge processing algorithms 464, based on game results 421.

Another example of an attribute which may be associated with a relationship between first and second users is a knowledge breadth value for a knowledge breadth attribute. A knowledge breadth attribute may be indicative of the breadth of knowledge user 1 has with respect to user 2, based on an assessment of user 1 regarding user 2 across multiple topics. For example, user 1 may, in the course of game play of games 420, exhibit a knowledge regarding user 2 across a broad range of topics. In this case, user 1 may be assigned a relatively high knowledge breadth value for a knowledge breadth attribute related to user 2.

In performing a selection of quiz templates 462 for population and selective communication to a particular user or users, the challenge processing algorithms 464 may apply one or more goal specifications 470 on which to optimize. In one embodiment, the goal specifications 470 may be defined as policies, which examine attributes of the quiz data (e.g., quiz templates 462). For example, each of the quiz templates 462 be assigned an entertainment attribute 472, an information attribute 474 and a monetization attribute 476, upon interaction with a user. Combined with prior knowledge of the user's activity and information, a level of entertainment, information, and monetization may be predicted for any selection among the quiz algorithms challenge processing. For example, game results may indicate that a particular quiz 462 exhibits a low entertainment value, as a result of a low 'dwell time' with respect to the particular quiz, but may exhibit a high information value, in that deep and rich information was provided by users in response to the particular quiz. Similarly, for another quiz, a monetization attribute value may be measured based on historical click throughs on information associated with the quiz to monetization opportunities. To this end, the challenge processing algorithms 464 may be optimized to select quiz templates 462 with high entertainment and information attribute values at one particular time for presentation within the context of games 420, but at another time select quiz questions that have a high monetization attribute value, based on historical data.

As an additional example, machine learning optimization algorithms 466 may predict that a certain contact of a user would enjoy playing a certain quiz game more than other contacts. To reach this prediction, the algorithms 466 used may include: the pre-processed information that this contact is strongly associated as a "personal friend;" the shared number of connections between this contact and the user on this social platform; and the contact's high response rate and quick response time when previously presented with quiz questions from this user. All of these inputs, including pre-processed data, profile data, and activity data, respectively, may be included in the algorithms 466 to predict the entertainment gain of selecting this user. More specifically, one algorithm that could be used would be a support vector machine. Using these inputs, combined with all the analogous inputs and response rates of other users who previously were presented with quizzes, the support vector regression can be trained to predict a likely response rate in this scenario, and is also capable of learning more accurate predictions as it iteratively creates predictions and is given feedback on its predictions' accuracy.

Figure 4B:
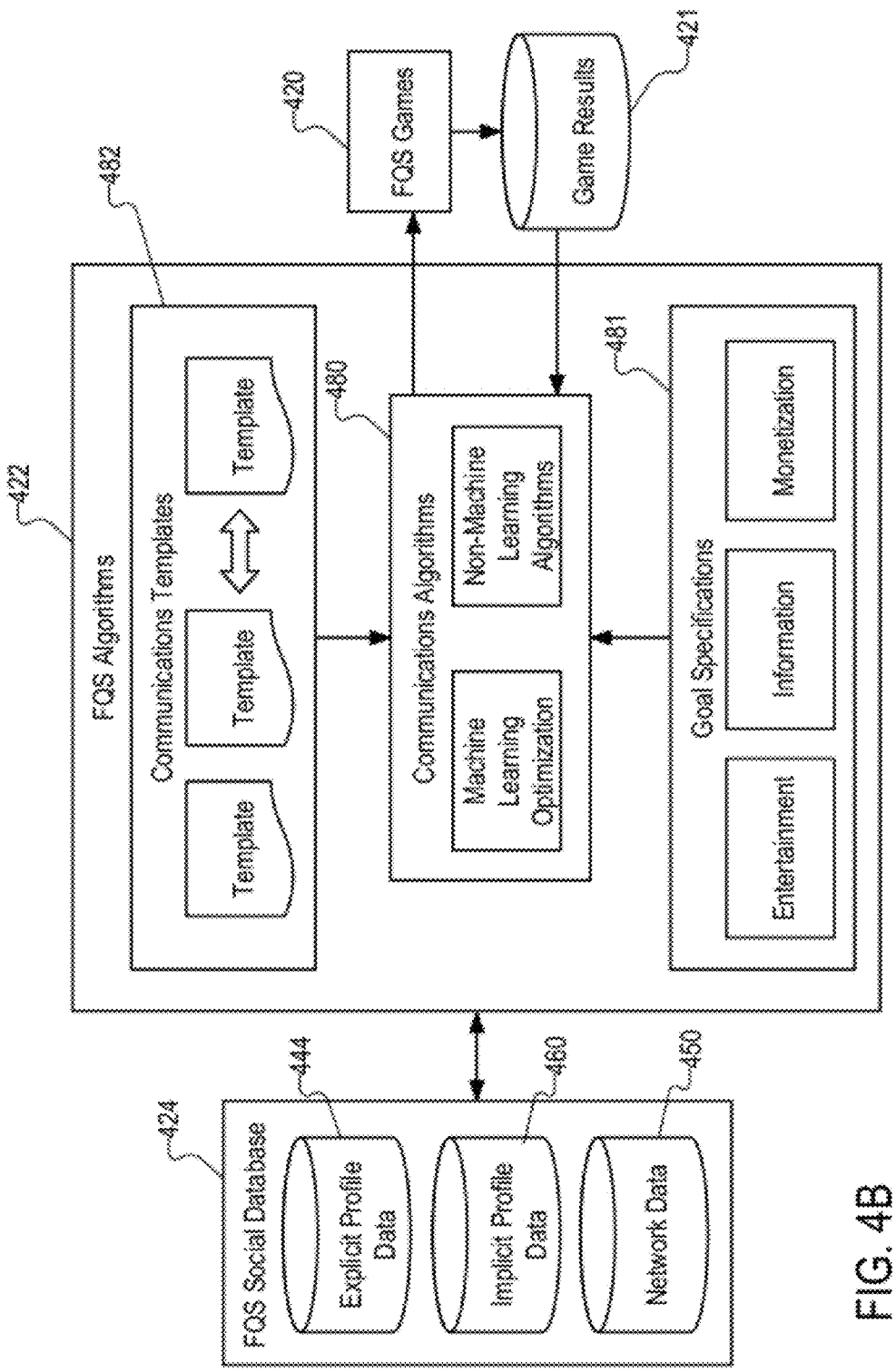
FIG. 4B is a block diagram illustrating components of communications algorithms, according to some example embodiments, that may form part of the friend quiz system algorithms.

FIG. 4B is a block diagram illustrating components of communications algorithms 480, according to some example embodiments, that may also form part of the quiz system algorithms 422. The communications algorithms 480 may operate to enhance virality of the social game system through communications relating to game activity (e.g., postings to the "walls" of users). In performing a selection of communication to a particular user or users, the communication algorithms 480 may apply one or more goal specifications 481 on which to optimize. In one embodiment, the goal specifications may be defined as policies, which examine attributes of the communication data (e.g., communication templates 482). Each communication may return a series of entertainment attributes, information attributes and monetization attributes upon interaction with a user. Combined with prior knowledge of the user's activity and information, a level of entertainment, information, and monetization may be predicted for any selection among the communication algorithms.

For example, in the embodiment of a Facebook quiz game, a user's quiz results may be posted on contact's 'wall.' In this example, the effectiveness of the 'wall post,' can be determined by the number of responses to the post, and the amount of time before the contact also joins the quiz game. These results can be used as inputs into the communication algorithms 480 to predict the likely success of wall posts in other instances.

As an additional example, it may be determined that users of a given demographic are a more valuable target audience for advertisements or sales connected to a Facebook game. These users can be identified by their explicit listings of age and gender in their Facebook data, or, if not specifically reported, can be inferred in machine learning algorithms 342. Using these demographics, a quiz game may be created to suggest sending 'application invites' to these users more frequently than to users outside the demographic.

Figure 5:
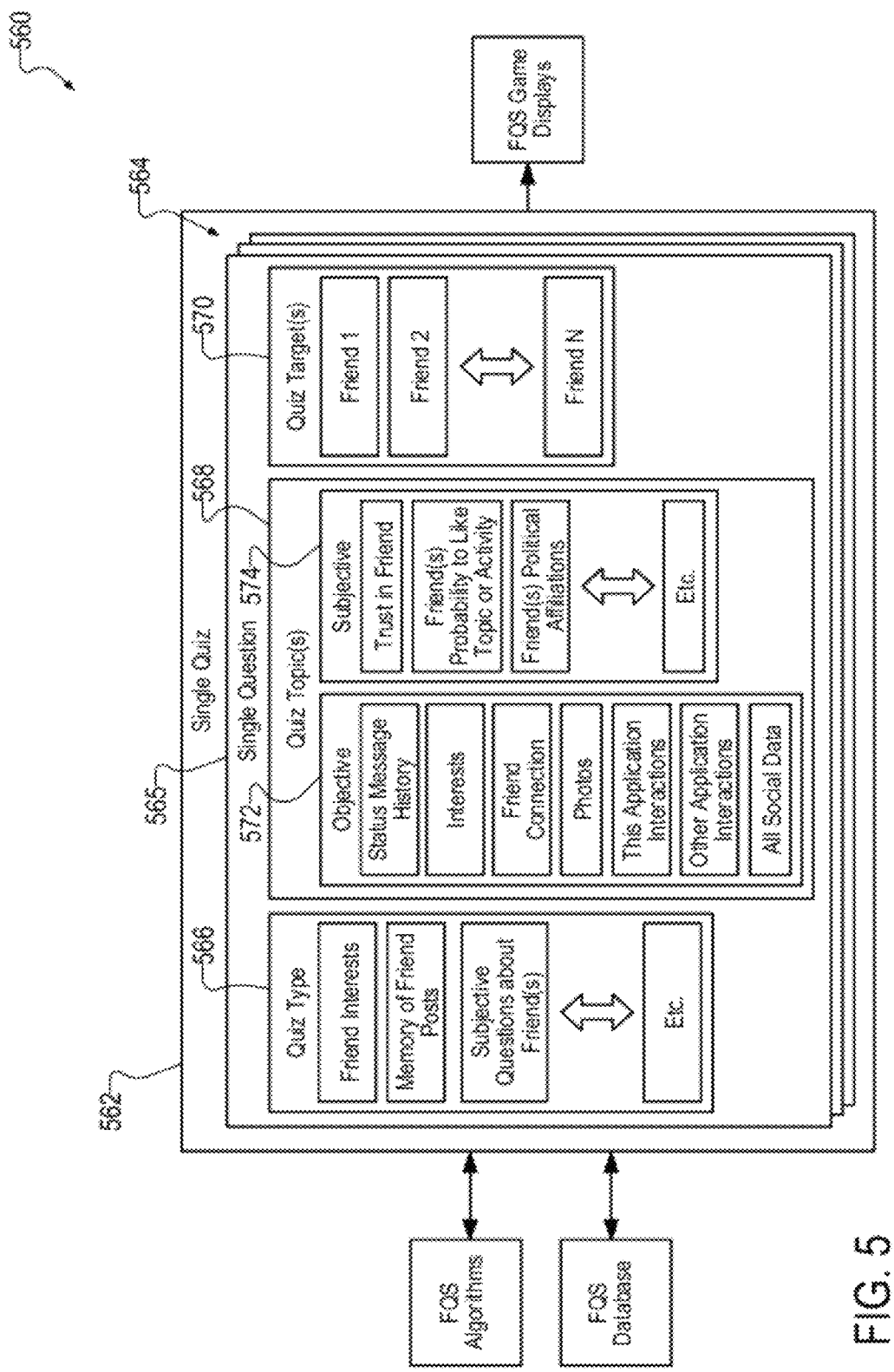
FIG. 5 is a block diagram depicting details regarding game templates, according to some example embodiments.

FIG. 5 is a block diagram depicting further details regarding game templates 560, according to an example embodiment. Specifically, a single quiz 562 is shown to be comprised of a collection 564 of questions 565, with each question 565 having a number of attributes including, for example, a quiz type attribute 566, a quiz topic attribute 568 (which may assume one or more quiz topic attribute values) and a quiz target attribute 570 (which may likewise assume one or more quiz target attribute values). Example values for quiz type attributes 566 may include friends' interests, memory of friends' posts, subjective questions by one or more friends, etc. Quiz topic attributes 568 may, in one example, be classified as either being objective 572 or subjective 574. Examples of objective quiz topic attributes include status message history, interests, friend connections, photos, game interactions, social data, etc. Examples of subjective quiz topic attributes include trust in friends, friend probability to like a topic or activity, friend political affiliations, etc. Quiz target attribute values may be added for one or more friends of a particular user that are previous or future potential targets for the relevant question.

Figure 6:
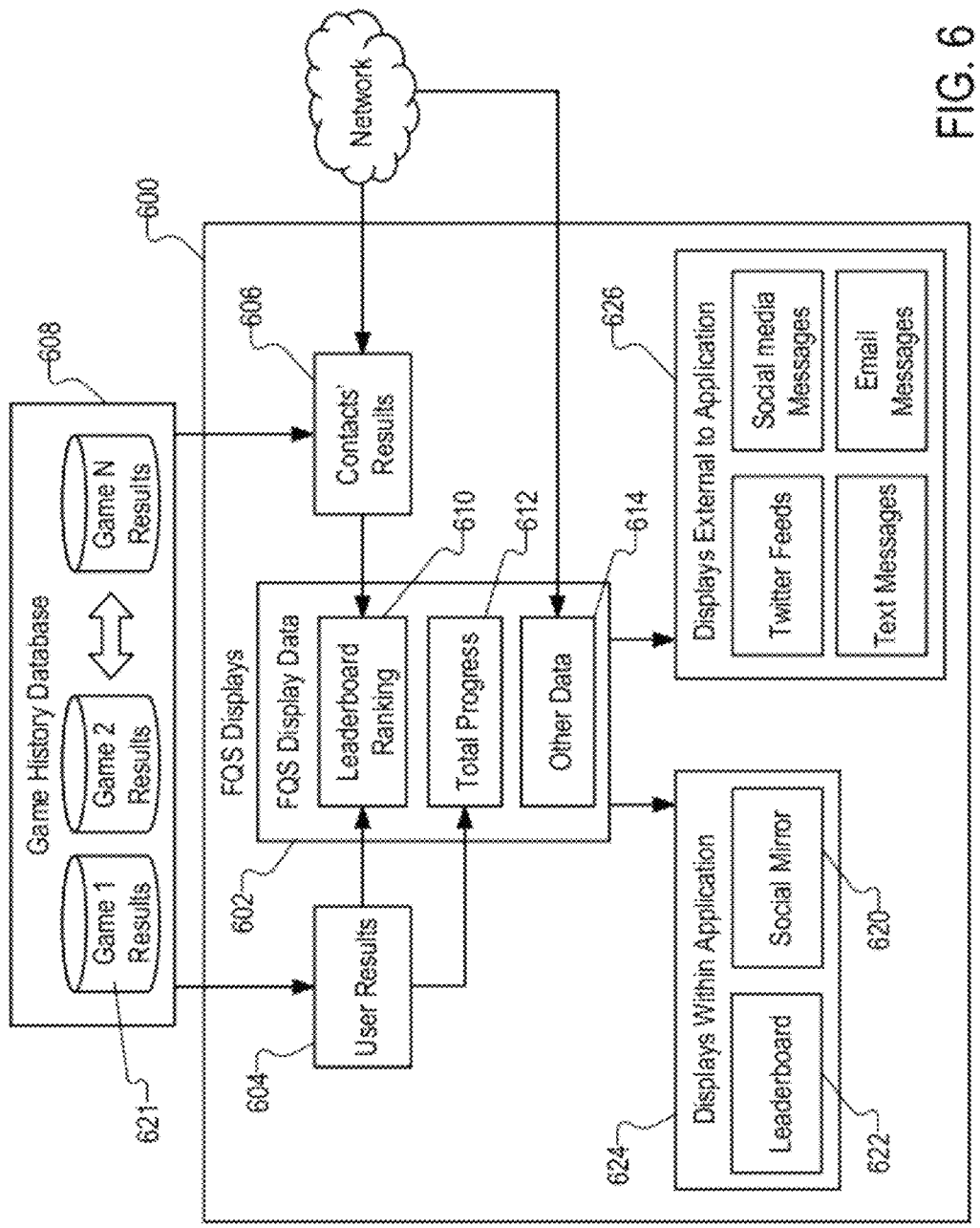
FIG. 6 is a block diagram illustrating details regarding displays (e.g., user interfaces and incorporated information) of a friend quiz system, according to some example embodiments.

FIG. 6 is a block diagram illustrating further details regarding displays 600 (e.g., user interfaces and incorporated information), according to some example embodiments, of a friend quiz system.

Various interfaces, examples of which are discussed in further detail below, include display data 602. The display data 602 may be compiled using user results 604 and contact results 606 from a game history database 608, which stores historical game results 621. Specifically, the display data 602 may include a leader-board ranking 610, a total progress display 612 and other data 614.

Dealing specifically with the leaderboard ranking 610, a 'leader board' score value may be created for each user, and stored as part of their profile data within the databases 624. The leader board score value may be based on a cumulative knowledge depth value, gleaned from knowledge depth attributes for a particular user across relationships of that user with other users. A cumulative knowledge breadth value, for knowledge breadth attributes for relationships of the user across other users, may similarly be factored into a leader board score value for that user. Finally, a user's completion of games of the quiz system games 420 may also be factored into calculating a leader board score value.

A ranking within the leaderboard ranking 610 may be calculated in a number of ways, such as, for example, with respect to all users of a quiz system, with respect to users that have played a particular game, or with respect to defined groups of 'competitors' against which a user has chosen to compete. Such groups of competitors may, in some example embodiments, comprise friends or contacts of the user who are also users of the quiz system. A ranking for a particular user within the leaderboard ranking 610 may be displayed alongside the rankings of a group of 'competitors' for the relevant user.

Figure 8:
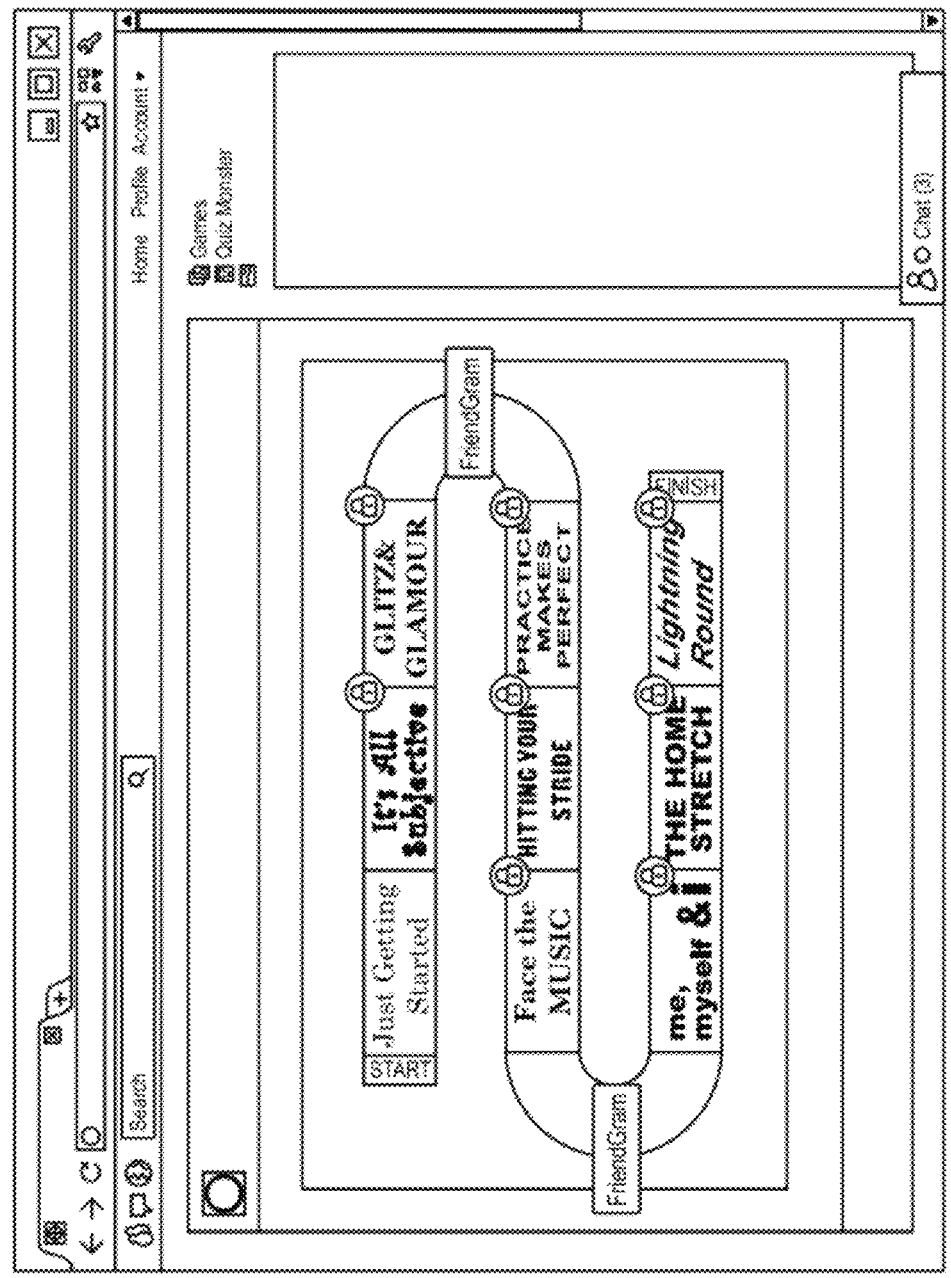
FIG. 8. is a user interface diagram showing an example game board user interface, according to some example embodiments.
Figure 9:
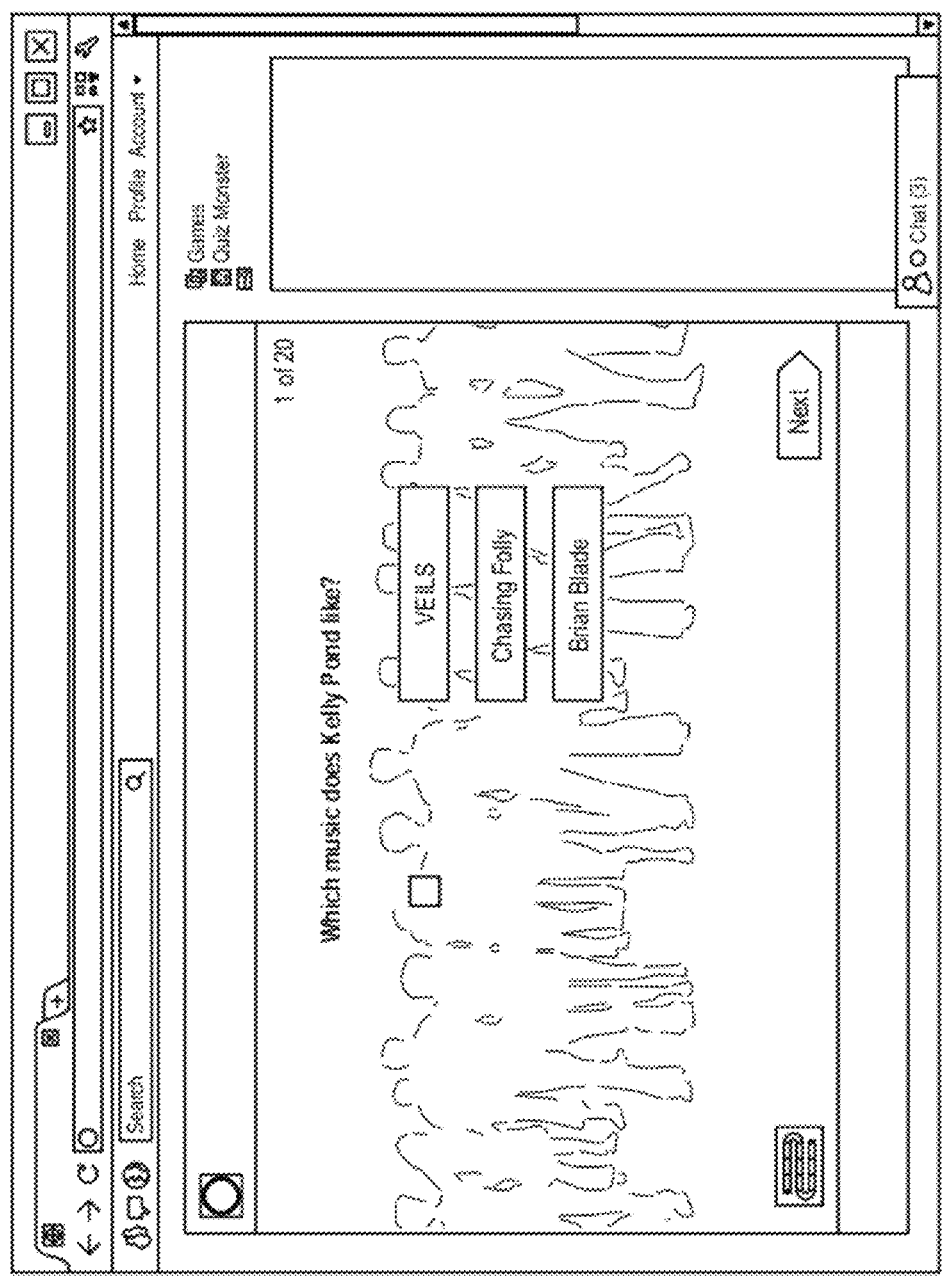
FIGS. 9-14 are a user interface diagrams illustrating various example question user interfaces that may be presented by displays of a friend quiz system, according to some example embodiments.
Figure 10:
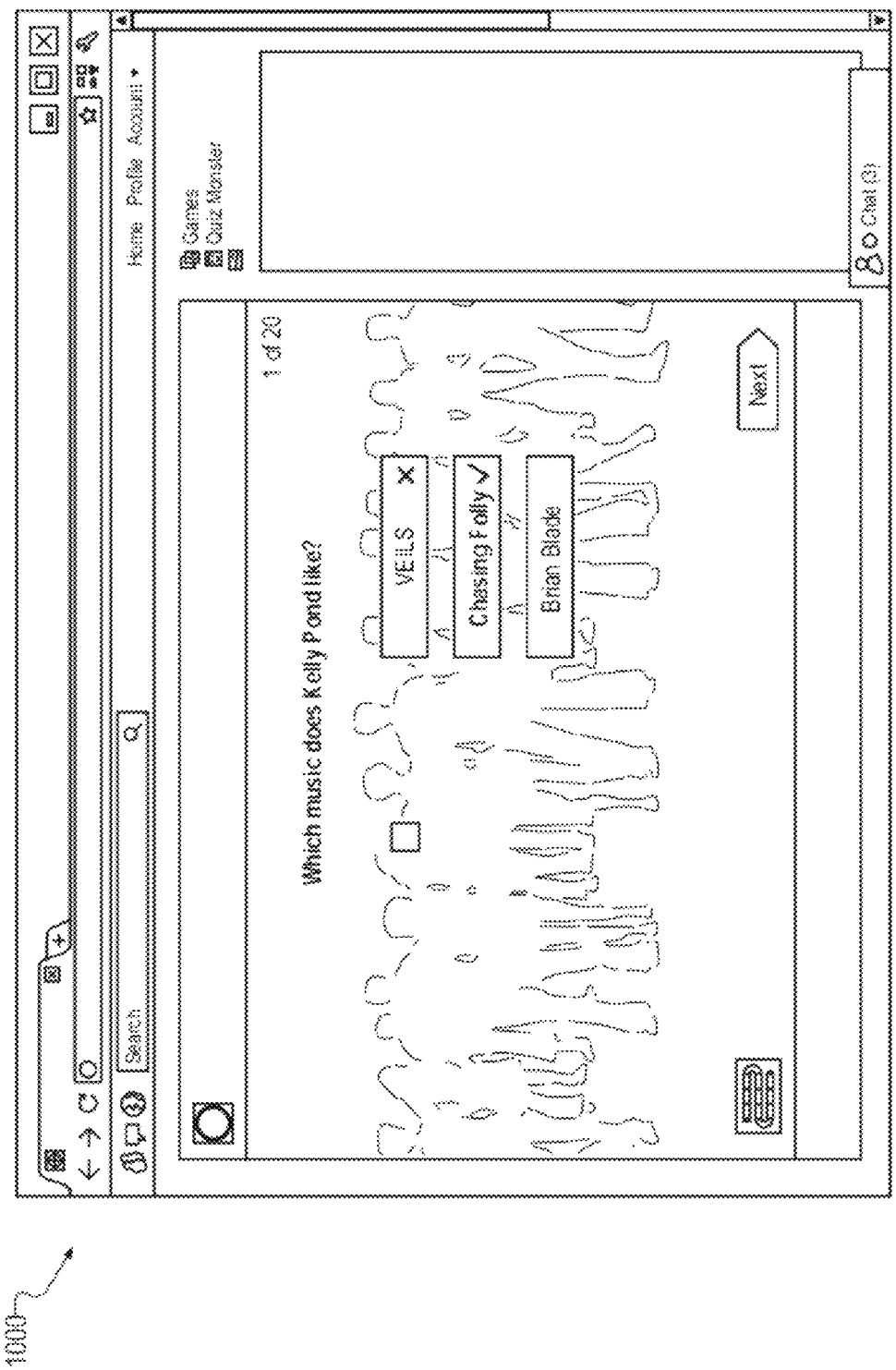
Figure 11:
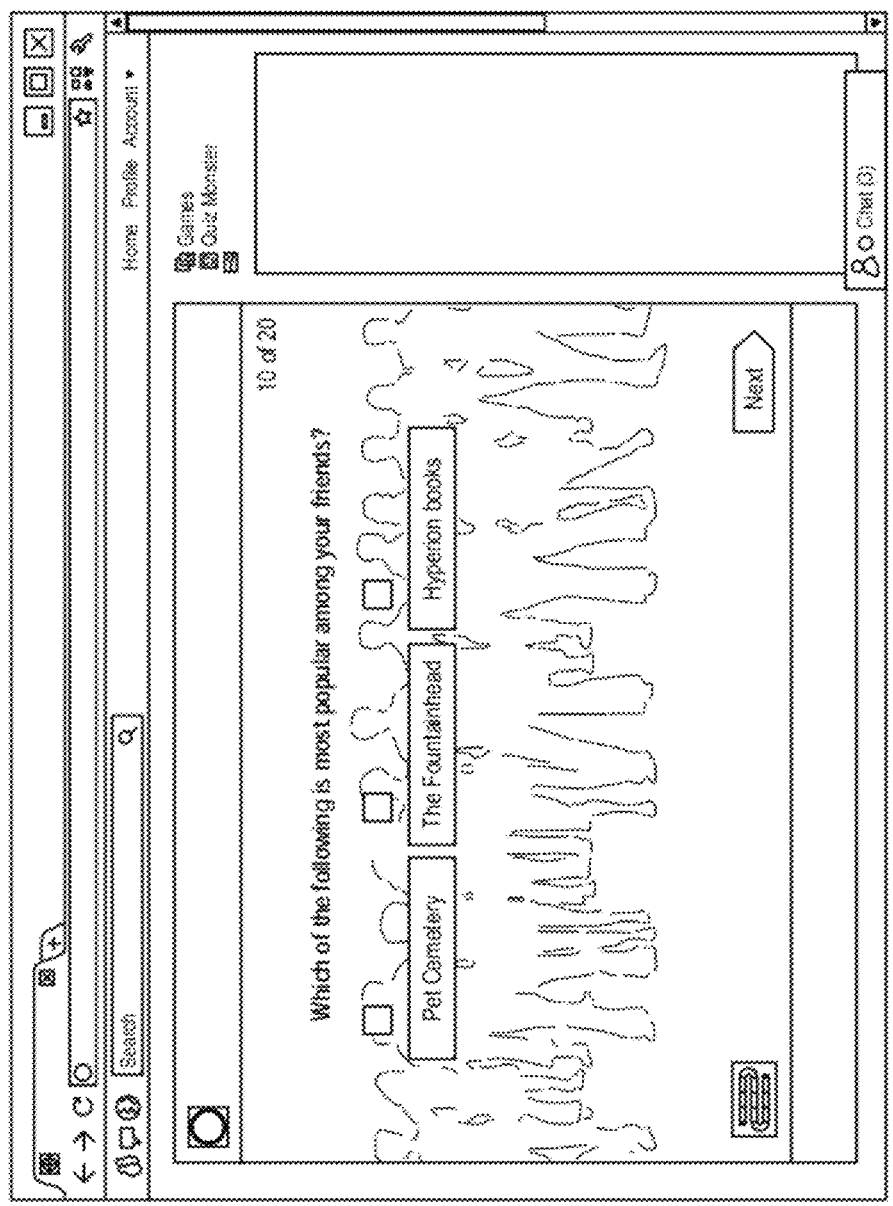
Figure 12:
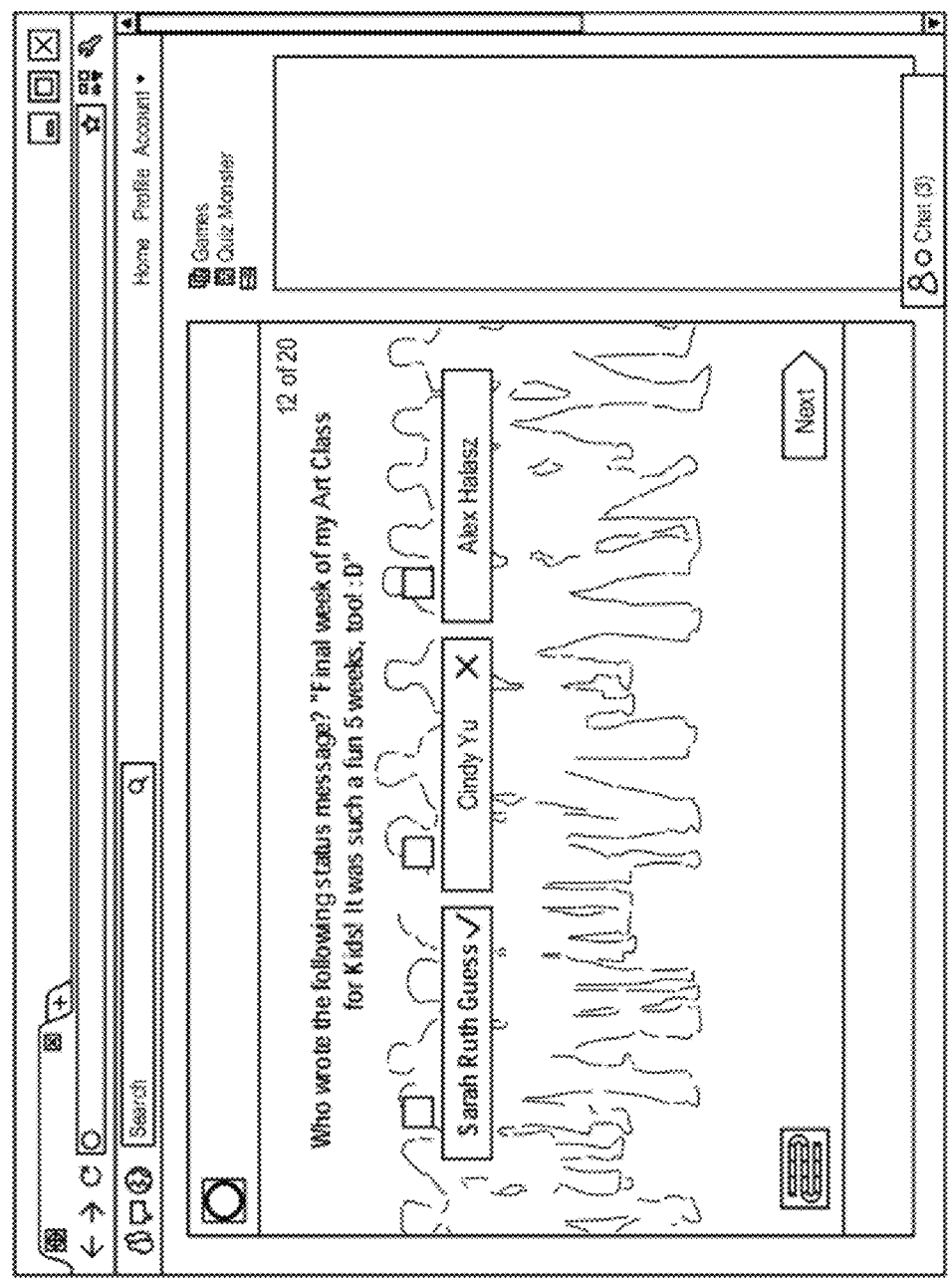
Figure 13:
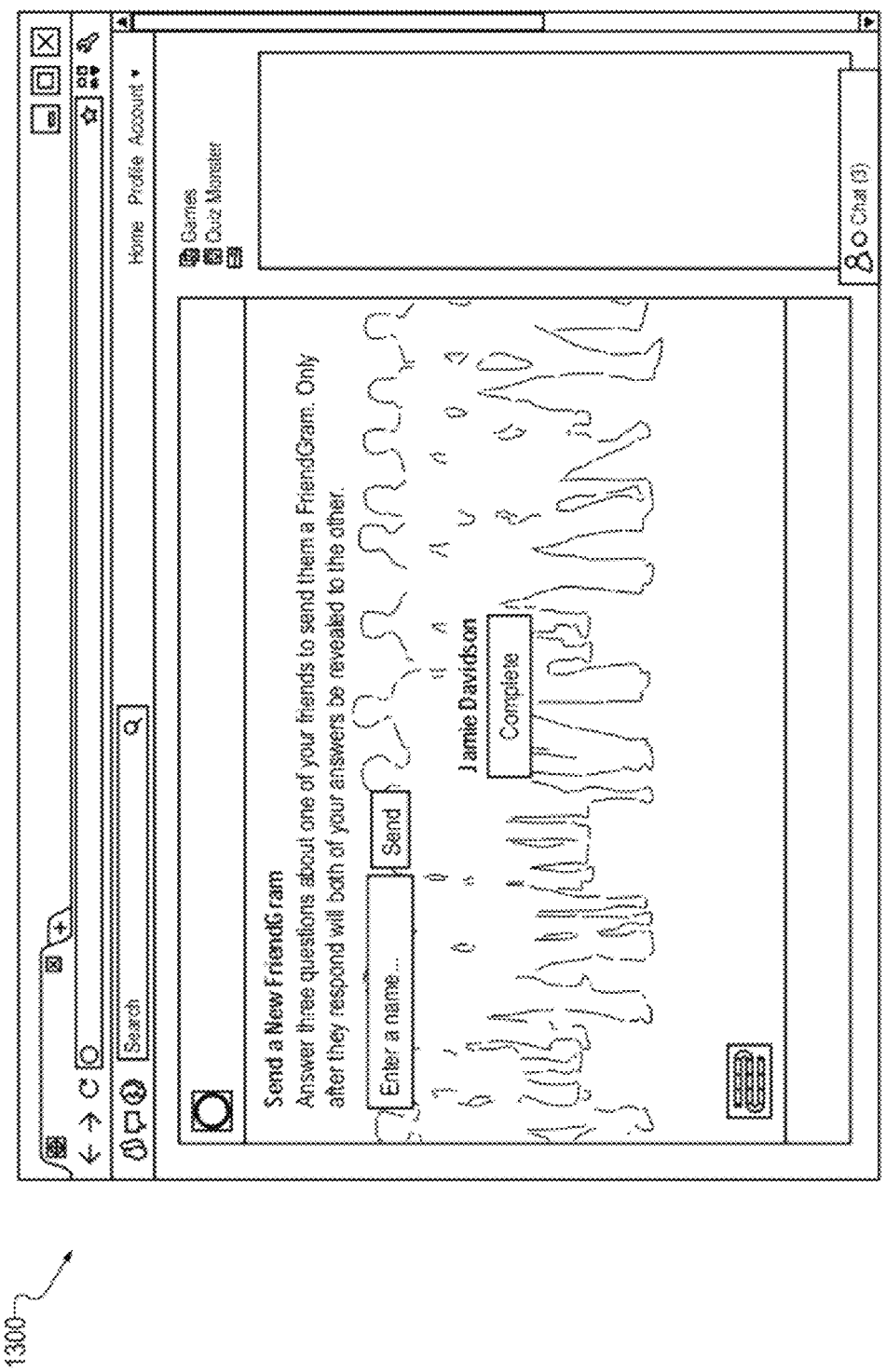
Figure 14:
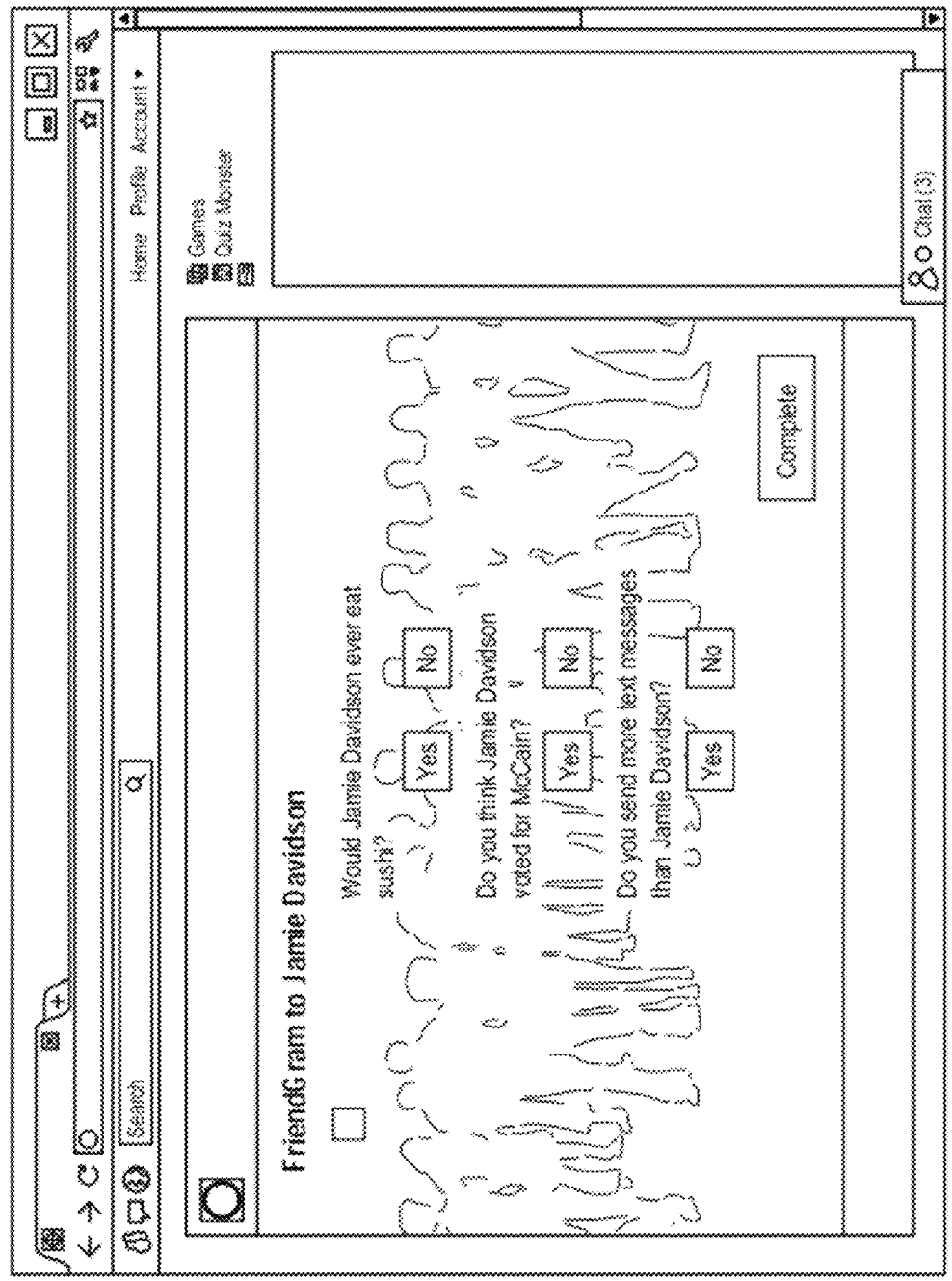

Total progress display data 612 may take the form of a 'game board,' an example of which is presented in FIG. 8. In one example embodiment, various quiz games 420 may constitute 'mini-games' in one overarching game, which may be referred to as a 'game board,' The 'game board' display, as an example of a total progress display data 612, may be the home screen of a quiz system, and a user may be brought to this homepage every time they access the quiz system. The 'game board' display places a user on a virtual board game where their progress through a sequence of mini-games is visually displayed.

The displays 600 further include in-application displays 624, which may in turn include leaderboard displays 622 that display ranking information with respect to a particular game (e.g., based on general criteria discussed above or with respect to specific game criteria) and response data 620 in the form of so-called 'social mirror' information. In one example embodiment, the response data 620 may provide feedback to a particular user regarding responses that they have previously provided with respect to attributes (e.g., profile or networking) of other users. For example, if a particular user correctly predicts a contact or friend to have an interest in the San Francisco Giants, the response data 620, upon a subsequent determination that the friend or contact does in fact like the San Francisco Giants, may present a message to the contact to communicate that the user knew that the friend liked the San Francisco Giants.

The response data 620 may, in example embodiments, also combine a user's recent activity within the context of a quiz system with activities of their friends or contacts, to generate and dynamically display such information back to a user.

Finally, the display 600 may include external data 626, which is external to a particular game or quiz system. Examples of such external data may include Twitter feeds, social media messages (e.g., Facebook messages), text messages, and email messages.

Figure 7:
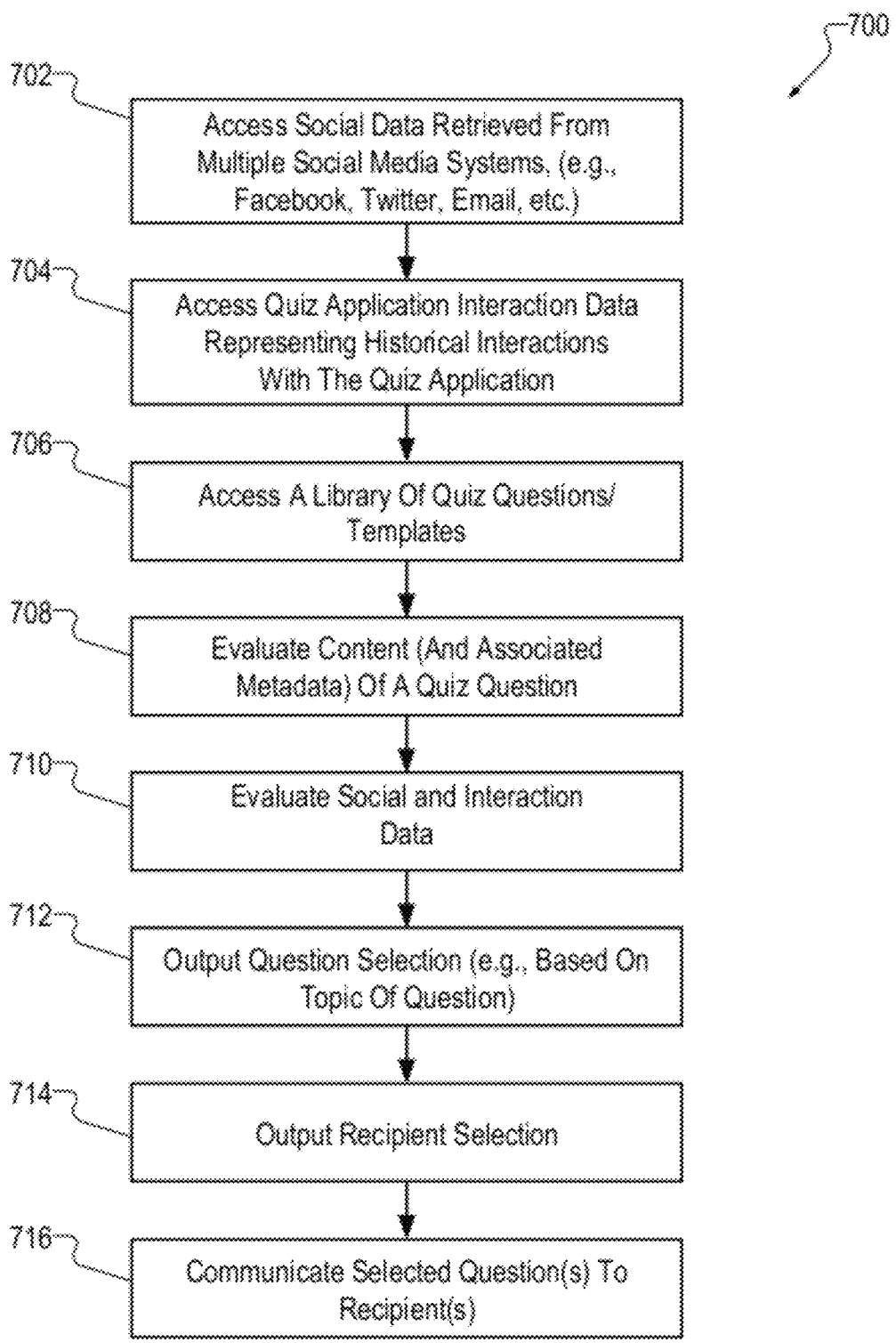
FIG. 7 is a flowchart illustrating a method to share quiz questions between users of a social game system, according to some example embodiments.

FIG. 7 is a flowchart illustrating a method 700, according to one example embodiment, to share quiz questions between users of a social game system. The operations of the method 700 may be performed via the various components, subsystems and modules described above, but may, in alternative embodiments, also be distributed and performed by other modules and components.

The method 700 commences at operation 702 with an access of social data by quiz algorithms 422. The social data may be retrieved from sources both internal and external to a quiz system. In one example embodiment, the social data may comprise the explicit and implicit profile data stored within a social database 424, explicit and implicit network data stored within a social database 424, and a game result data 421, for example stored within a game history database 608.

At operation 704, the quiz algorithms 422 access quiz application interaction data (e.g., real time game results 421 or historical game results 621 stored within a game history database 608).

At operation 706, the challenge processing algorithms 464 may access quiz data, in the example form of a library 461 of quiz templates 462.

At operation 708, the challenge processing algorithms 464 evaluate both content and meta-data (e.g., attributes) of the various quiz templates 462 within the library 461. This evaluation may include determining a quiz type, topic and targets for a particular quiz template 462.

At operation 710, the challenge processing algorithms 464 evaluate the social and interaction data accessed at operation 702 and 704 against the content and meta-data of the quiz templates.

At operation 712, the challenge processing algorithms 464 then output a selection of a particular quiz (e.g., as a collection of questions) based on the evaluation of the social and interaction data against the quiz data. Specifically, the quiz selection may include the selection of one or more quiz templates for quizzes to be presented to a particular user regarding a contact of that user, or may comprise a particular quiz to be sent from one user to a contact or friend of that particular user.

At operation 714, the challenge processing algorithms 464 output a recipient list for the selected questions, and the selected questions are thereafter communicated to the selected recipients at operation 716.

FIG. 8. is a user interface diagram showing an example game board user interface 800. The interface depicts a series of mini-games (e.g., games 420) in a sequence in which the games can be completed and also provides a visual indication of a particular user's progress through the sequence of games.

FIGS. 9-14 are a user interface diagrams illustrating various example question user interfaces 900-1400 that may be presented as part of the displays 600 discussed above with reference to FIG. 6.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Specific to "machine learning" algorithms, certain methods described herein may be particularly processing-intensive, and may require a superior degree of computing power. Machine learning algorithms are partially distinguished by including certain techniques to analyze data that scale in effectiveness with respect to the ability of the processor(s) used. That is, many problems approached in social optimization constitute "non-polynomial" problems (e.g., problems that cannot be perfectly solved in a reasonable amount of time), and are instead imperfectly solved using standard "heuristics" (e.g., experience-based assumptions). Therefore, given the impossibility of a perfect solution, the margin of error in the heuristic used may be partially determined by the capability of the computer. For example, one common machine learning technique, decision trees, often involves reducing the complexity of the model when processing is limited (e.g., "cost of complexity pruning").

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, a data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 15:
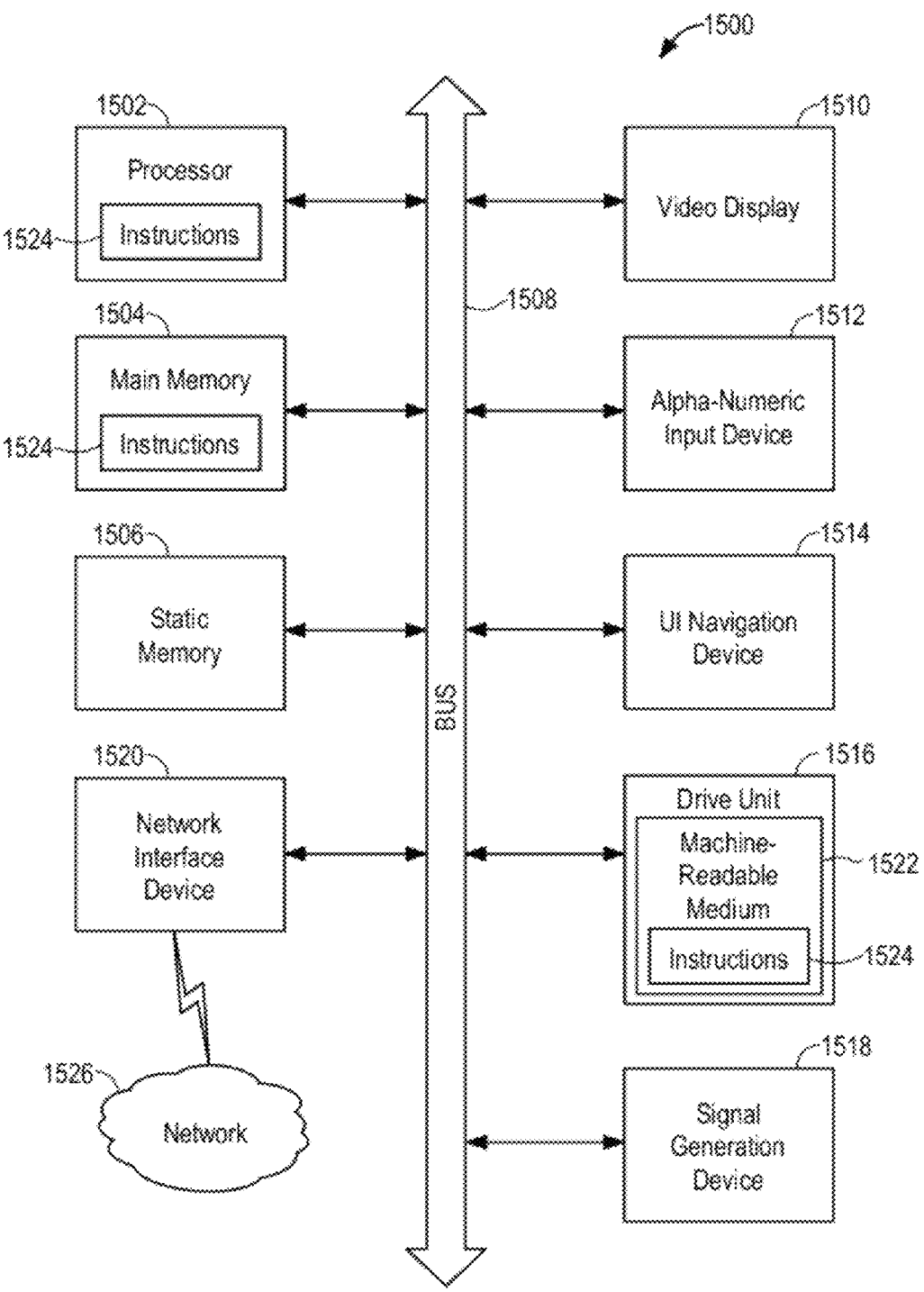
FIG. 15 is a block diagram of a machine in the example form of a computer system within which instructions for causing the machine to perform any one or more of the methodologies discussed herein may be executed.

FIG. 15 is a block diagram of a machine in the example form of a computer system 1500 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1504 and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard), a user interface (UI) navigation device 1514 (e.g., a mouse), a disk drive unit 1516, a signal generation device 1518 (e.g., a speaker) and a network interface device 1520.

Machine-Readable Medium

The disk drive unit 1516 includes a machine-readable medium 1522 on which is stored one or more sets of instructions 1524 and data structures (e.g., software) embodying or utilized by any one or more of the methodologies or functions described herein. The instructions 1524 may also reside, completely or at least partially, within the main memory 1504 and/or within the processor 1502 during execution thereof by the computer system 1500, with the main memory 1504 and the processor 1502 also constituting machine-readable media.

While the machine-readable medium 1522 is shown in an example embodiment to be a single medium, the term "machine-readable medium" may include a single medium or multiple media (e.g., a centralized or distributed database and/or associated caches and servers) that store the one or more instructions or data structures. The term "machine-readable medium" shall also be taken to include any tangible medium that is capable of storing, encoding or carrying instructions for execution by the machine and that causes the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1524 may further be transmitted or received over a communications network 1526 using a transmission medium. The instructions 1524 may be transmitted using the network interface device 1520 and any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method to provide game challenges among users within a social game system, the method comprising:

receiving interaction data, the interaction data reflecting one or more interactions between a first user and a second user within the social game system;

generating relationship data based on the interaction data, the relationship data including 1) a type of relationship between the first user and the second user, 2) a strength of the a relationship between the first user and the second user, and 3) knowledge of the second user with respect to the first user, the knowledge based on determining an accuracy of responses by the second user to a plurality of questions by the first user;

generating a particular game challenge for the second user based on the relationship data generated, the particular game challenge including a different plurality of questions about the first user for response by the second user;

providing the particular game challenge about the first user to the second user;

determining a cumulative knowledge value for the second user based on the accuracy of the responses by the second user to the different plurality of questions about the first user, the cumulative knowledge value indicative of assessed knowledge of the second user with respect to the first user; and generating a ranking score for the second user based on the cumulative knowledge value of the second user.

2. The computer-implemented method of claim 1, wherein generating the particular game challenge further comprises:

selecting a particular game challenge template, from a plurality of game challenge templates, based on at least one of the relationship data and the interaction data; and populating the game challenge template with the relationship data.

3. The computer-implemented method of claim 2, further comprising:

determining at least one attribute of the plurality of game challenge templates; and determining at least one attribute of the relationship data, wherein selecting the particular game challenge template is based on a comparison of the at least one attribute of the plurality of game challenge templates and the at least one attribute of the relationship data.

4. The computer-implemented method of claim 3, wherein the at least one attribute of the relationship data is the type of the relationship between the first user and the second user, and wherein selecting the particular game challenge template is based on the type of the relationship between the first user and the second user.

5. The computer-implemented method of claim 4, further comprising assessing the type of the relationship based on information communicated between the first user and the second user.

6. The computer-implemented method of claim 3, wherein the at least one attribute of the relationship data is the strength of the relationship between the first user and the second user, and wherein selecting the particular game challenge template is based on the strength of the relationship between the first user and the second user.

7. The computer-implemented method of claim 6, further comprising:

assessing the strength of the relationship between the first user and the second user based on at least one of a threshold level of trust between the first user and the second user determined from the relationship data and a threshold degree of influence of the first user on the second user determined from the relationship data.

8. The computer-implemented method of claim 6, wherein the strength of the relationship is based on proximity of the first user to the second user.

9. The computer-implemented method of claim 3, wherein the at least one attribute of the relationship data is at least one of a binary value relationship attribute and a range value relationship attribute.

10. The computer-implemented method of claim 2, further comprising:

generating respective attribute values for a plurality of attributes of the plurality of game challenge templates, wherein selecting the particular game challenge template is based on at least one of the plurality of attributes of the plurality of game challenge templates.

11. The computer-implemented method of claim 10, wherein the plurality of attributes include an entertainment attribute indicative of a historical entertainment measure pertaining to the plurality of game challenge templates.

12. The computer-implemented method of claim 10, wherein the plurality of attributes include a monetization attribute indicative of a historical monetization measure pertaining to the plurality of game challenge templates.

13. The computer-implemented method of claim 10, wherein the plurality of attributes include an information attribute indicative of a historical information contribution attributable to the plurality of game challenge templates.

14. The computer-implemented method of claim 13, wherein the historical information contribution comprises at least one of a historical profile information contribution and a historical relationship information contribution.

15. The computer-implemented method of claim 1, further comprising retrieving the relationship data from a third party social networking platform.

16. The computer-implemented method of claim 1, wherein the relationship data defines explicit relationship data about at least one of the first user or the second user.

17. The computer-implemented method of claim 1, wherein the relationship data defines implicit relationship data about at least one of the first user or the second user.

18. The computer-implemented method of claim 1, wherein generating of the particular game challenge is performed using challenge processing algorithms, the challenge processing algorithms including at least one of machine learning algorithms and non-machine learning algorithms.

19. The computer-implemented method of claim 1, wherein generating the relationship data further comprises maintaining a plurality of relationship attributes pertaining to relationships between the first user and the second user.

20. The computer-implemented method of claim 1, wherein the knowledge a knowledge depth of the second user with respect to the first user, the knowledge depth being assessed based on a determined assessment of the knowledge of the second user about the first user on a specific topic.

21. The computer-implemented method of claim 1, wherein the knowledge a knowledge breadth of the second user with respect to the first user, the knowledge breadth being assessed based on a determined assessment of the knowledge of the second user about the first user across a plurality of topics.

22. The computer-implemented method of claim 1, further comprising:

receiving a response to the particular game challenge about the first user from the second user;

and accessing a profile of the first user within a profile database to assess the accuracy of the response of the second user about the first user.

23. The computer-implemented method of claim 22, further comprising:

determining that the profile of the first user does not include an attribute value corresponding to the response received to the particular game challenge from the second user;

monitoring the profile of the first user to determine an update to the profile of the first user to include the attribute value corresponding to the response; and responsive to determining the update, providing an indication to the second user regarding the accuracy of the response.

24. The computer-implemented method of claim 1, further comprising:
  receiving a first response to the particular game challenge from the second user;
  advising the first user that the second user has provided the first response; and
  presenting the first user with an option to provide a second response, pertaining to the second user, to the particular game challenge.

25. The computer-implemented method of claim 24, further comprising selectively presenting the first response to the first user based on the second user providing the first response to the particular game challenge.

26. The computer-implemented method of claim 1, further comprising:
  accessing profile data in a profile database, the profile data pertaining to the first user and the second user, wherein the second user is associated with a social graph of the first user of the social game system; and
  selecting a particular game challenge template, from a plurality of game challenge templates, based on the profile data from the profile database.

27. The computer-implemented method of claim 26, further comprising populating the particular game challenge template using the profile data from the profile database, the profile data pertaining to the first user and the second user.

28. The computer-implemented method of claim 26, further comprising:
  determining at least one attribute of the plurality of game challenge templates;
  determining at least one attribute of the profile data pertaining to the first user and the second user; and
  generating the particular game challenge based on a comparison of the at least one attribute of the plurality of game challenge templates and the at least one attribute of the profile data.

29. The computer-implemented method of claim 26, wherein accessing the profile data further comprises receiving the profile data from a third party social networking platform.

30. The computer-implemented method of claim 29, wherein accessing the profile data further comprises receiving explicit profile data associated with the first user and the second user.

31. The computer-implemented method of claim 29, wherein accessing the profile data further comprises receiving implicit profile data associated with the first user and the second user.

32. The computer-implemented method of claim 29, wherein accessing the profile data is performed using challenge processing algorithms, the challenge processing algorithms including at least one of machine learning algorithms and non-machine learning algorithms.

33. The computer-implemented method of claim 1, wherein the interaction data includes historical communications data identifying historical communications between the first user and the second user, and wherein generating the particular game challenge is based on the historical communications data.

34. The computer-implemented method of claim 1, wherein the social game system facilitates access to a plurality of challenge games, the method further comprising:
  accessing a sequence of the plurality of challenge games;
  generating a user interface depicting the sequence of the plurality of challenge games; and
  providing a visual indication of progress of a user through the sequence of the plurality of challenge games.

35. A system comprising:
  one or more computers; and
  one or more non-transitory machine-readable storage media having instructions stored thereon, the instruction being operable, when executed by the one or more computers, to cause the one or more computers to perform operations comprising:
  receiving interaction data, the interaction data reflecting one or more interactions between a first user and a second user within the social game system;
  generating relationship data based on the interaction data, the relationship data indicative of 1) a type of relationship between the first user and the second user, 2) a strength of the relationship between the first user and the second user, and 3) knowledge of the second user with respect to the first user, the knowledge based on determining an accuracy of responses by the second user to a plurality of questions by the first user;
  generating a particular game challenge for the second user based on the relationship data generated, the particular game challenge including a different plurality of questions about the first user for response by the second user;
  providing the particular game challenge about the first user to the second user;
  determining a cumulative knowledge value for the second user based on an accuracy of the responses by the second user to the different plurality of questions about the first user, the cumulative knowledge value indicative of assessed knowledge of the second user with respect to the first user; and
  generating a ranking score for the second user based on the cumulative knowledge value of the second user.

36. The system of claim 35, wherein generating the particular game challenge further comprises:
  selecting a particular game challenge template, from a plurality of game challenge templates, based on at least one of the relationship data and the interaction data; and
  populating the game challenge template with the relationship data.

37. The system of claim 36, wherein the operations further comprise:
  generating respective attribute values for a plurality of attributes of the plurality of game challenge templates, and
  wherein selecting the particular game challenge template is based on at least one of the plurality of attributes of the plurality of game challenge templates.

38. The system of claim 35, wherein the operations further comprise:
  determining at least one attribute of the plurality of game challenge templates; and
  determining at least one attribute of the relationship data, wherein
  selecting the particular game challenge template is based on a comparison of the at least one attribute of the plurality of game challenge templates and the at least one attribute of the relationship data.

39. The system of claim 35, wherein the operations further comprise retrieving the relationship data from a third party social networking platform.

40. The system of claim 35, wherein the operations further comprise:
  accessing profile data in a profile database, the profile data pertaining to the first user and the second user, wherein the second user is associated with a social graph of the first user of the social game system; and selecting a particular game challenge template, from a plurality of game challenge templates, based on the profile data from the profile database.

41. The system of claim 40, wherein the operations further comprise:
  determining at least one attribute of the plurality of game challenge templates;
  determining at least one attribute of the profile data pertaining to the first user and the second user; and
  generating the particular game challenge based on a comparison of the at least one attribute of the plurality of game challenge templates and the at least one attribute of the profile data.

42. The system of claim 35, wherein the social game system facilitates access to a plurality of challenge games, the operations further comprising:
  accessing a sequence of the plurality of challenge games;
  generating a user interface depicting the sequence of the plurality of challenge games; and
  providing a visual indication of progress of a user through the sequence of the plurality of challenge games.

43. A non-transitory computer-readable storage medium encoded with a computer program, the computer program comprising instructions that when executed by one or more computers cause the one or more computers to perform operations comprising:
  receiving interaction data, the interaction data reflecting one or more interactions between a first user and a second user within the social game system;
  generating relationship data based on the interaction data, the relationship data indicative of 1) a type of relationship between the first user and the second user, 2) a strength of the relationship between the first user and the second user, and 3) knowledge of the second user with respect to the first user, the knowledge based on determining an accuracy of responses by the second user to a plurality of questions by the first user;
  generating a particular game challenge for the second user based on the relationship data generated, the particular game challenge including a different plurality of questions about the first user for response by the second user;
  providing the particular game challenge about the first user to the second user; determining a cumulative knowledge value for the second user based on an accuracy of the responses by the second user to the different plurality of questions about the first user, the cumulative knowledge value indicative of assessed knowledge of the second user with respect to the first user; and
  generating a ranking score for the second user based on the cumulative knowledge value of the second user.

44. The non-transitory computer-readable storage medium of claim 42, wherein generating the particular game challenge further comprises:
  selecting a particular game challenge template, from a plurality of game challenge templates, based on at least one of the relationship data and the interaction data; and
  populating the game challenge template with the relationship data.

45. The non-transitory computer-readable storage medium of claim 44, wherein the operations further comprise:
  generating respective attribute values for a plurality of attributes of the plurality of game challenge templates, and
  wherein selecting the particular game challenge template is based on at least one of the plurality of attributes of the plurality of game challenge templates.

46. The non-transitory computer-readable storage medium of claim 42, wherein the operations further comprise:
  determining at least one attribute of the plurality of game challenge templates data;
  determining at least one attribute of the relationship data, wherein
  selecting the particular game challenge template based on a comparison of the at least one attribute of the plurality of game challenge templates and the at least one attribute of the relationship data.

47. The non-transitory computer-readable storage medium of claim 43, wherein the operations further comprise retrieving the relationship data from a third party social networking platform.

48. The non-transitory computer-readable storage medium of claim 43, wherein the operations further comprise:
  accessing profile data in a profile database, the profile data pertaining to the first user and the second user, wherein the second user is associated with a social graph of the first user of the social game system; and
  selecting a particular game challenge template, from a plurality of game challenge templates, based on the profile data from the profile database.

49. The non-transitory computer-readable storage medium of claim 48, wherein the operations further comprise:
  determining at least one attribute of the plurality of game challenge templates;
  determining at least one attribute of the profile data pertaining to the first user and the second user; and
  generating the particular game challenge based on a comparison of the at least one attribute of the plurality of game challenge templates and the at least one attribute of the profile data.

50. The non-transitory computer-readable storage medium of claim 43, wherein the social game computer storage medium facilitates access to a plurality of challenge games, the operations further comprising:
  accessing a sequence of the plurality of challenge games;
  generating a user interface depicting the sequence of the plurality of challenge games; and
  providing a visual indication of progress of a user through the sequence of the plurality of challenge games.

* * * * *